United States Patent
Rodriguez

(10) Patent No.: US 8,708,831 B2
(45) Date of Patent: Apr. 29, 2014

(54) U-JOINT ARRANGEMENT AND METHOD OF ATTACHING A PROPELLER SHAFT TO A PINION FLANGE

(75) Inventor: Rolando V. Rodriguez, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/307,814

(22) Filed: Nov. 30, 2011

(65) Prior Publication Data

US 2013/0137527 A1    May 30, 2013

(51) Int. Cl.
*F16D 3/40*    (2006.01)

(52) U.S. Cl.
USPC ........................................ 464/130; 29/525.11

(58) Field of Classification Search
CPC ....... F16D 3/385; F16D 3/41; F16C 33/7809; B23P 11/00
USPC ........... 464/128–131, 136; 29/525.11, DIG. 9
See application file for complete search history.

(56) References Cited

U.S. PATENT DOCUMENTS

| | | | | |
|---|---|---|---|---|
| 1,380,270 A | * | 5/1921 | Swenson ................... | 464/136 X |
| 2,081,505 A | * | 5/1937 | Padgett ......................... | 464/128 |
| 4,144,724 A | * | 3/1979 | Armasow et al. ............. | 464/128 |
| 4,710,038 A | * | 12/1987 | Hennon et al. ............ | 464/130 X |
| 6,685,569 B2 | * | 2/2004 | Kurzeja et al. ............ | 464/128 X |

OTHER PUBLICATIONS

Rodriguez, Rolando V., Photo of 2011 Ford F-250 Super Duty Pickup Truck taken by inventor at 2011 Detroit North American International Auto Show, Jan. 20, 2011, Detroit, Michigan.

* cited by examiner

*Primary Examiner* — Gregory Binda
(74) *Attorney, Agent, or Firm* — Ingrassia Fisher & Lorenz, P.C.

(57) ABSTRACT

A U-joint arrangement for attaching a propeller shaft to a pinion flange is disclosed herein. At least one of the pinion flange and the propeller shaft has a pair of full-round receivers. The U-joint arrangement includes, but is not limited to, a U-joint having a cross member and a plurality of bearing cups rotatably mounted to the cross member. A pair of the bearing cups each have an outer diameter that is substantially less than an inner diameter of the pair of full-round receivers. The U-joint arrangement further includes a pair of retaining members that engage the pair of bearing cups and that are configured to engage the pair of full-round receivers. The pair of retaining members are further configured to support the pair of bearing cups within the pair of full-round receivers when the pair of retaining members are engaged with the pair of full-round receivers.

20 Claims, 15 Drawing Sheets

U-JOINT ARRANGEMENT AND METHOD OF ATTACHING A PROPELLER SHAFT TO A PINION FLANGE

TECHNICAL FIELD

The technical field generally relates to vehicles, and more particularly relates to a U-joint arrangement and a method of using the U-joint arrangement to attach a propeller shaft to a pinion flange.

BACKGROUND

A propeller shaft, also known as a drive shaft, delivers torque generated by a vehicle's engine to the vehicle's driven wheels. A key link in the delivery of torque to the vehicle's driven wheels is the connection between the propeller shaft and a pinion flange which is connected to the axle to which the driven wheels are mounted. When the propeller shaft rotates, it causes the pinion flange to rotate. When the pinion flange rotates, it delivers torque to the driven wheels.

Because the pinion flange and the propeller shaft do not remain continuously parallel with one another as the vehicle is operated, a U-joint is used to connect the propeller shaft to the pinion flange. U-joints are well known in the art. A conventional U-joint includes a cross member and four bearing cups. The cross member has four highly machined cylindrical protrusions. The four protrusions are arranged in the shape of a cross or a plus sign. The four bearing cups fit over the four protrusions and are designed to rotate about the protrusions, each pair of oppositely disposed bearing cups serving as an axis of rotation for the U-joint. Configured in this manner, a U-joint enables the transmission of torque from the propeller shaft to the pinion flange under circumstances where there is a non-zero angle between their respective longitudinal axes.

To connect the propeller shaft to the U-joint, a conventional propeller shaft is fitted with a weld yoke. The weld yoke has a pair of full-round receivers. Full-round receivers are one-piece structures that include circular openings that enable the weld yoke (or any other structure) to engage the pair of bearing cups for a full 360 degrees about its circumference. The full-round receivers of the weld yoke engage a first pair of bearing cups of the U-joint and therefore the propeller shaft is enabled to rotate about an axis formed by the first pair of bearing cups.

The second pair of oppositely disposed bearing cups conventionally engage receivers on the pinion flange. The pinion flange conventionally does not utilize full-round receivers. Rather, the pinion flange conventionally includes two semi-circular openings that are spaced apart and configured to receive the second pair of bearing cups. Once the second pair of bearing cups are seated in the semi-circular openings, semi-circular retainers are positioned over the second pair of bearing cups and fastened to the pinion flange, thereby attaching the second pair of bearing cups to the pinion flange. The fasteners used to attach the semi-circular retainers to the semi-circular openings are typically threaded fasteners that are inserted in the longitudinal direction of the pinion flange. With the semi-circular retainers attached in this manner, the pinion flange may now rotate about the axis formed by the second pair of bearing cups.

The longer the distance between the engine and the driven wheels, the longer the propeller shaft will need to be. The longer the propeller shaft is, the larger the diameter the propeller shaft will need to have in order to oppose the naturally occurring bending force that acts on the propeller shaft as it rotates. As the diameter of the propeller shaft increases, it encroaches on, and limits access to, the fasteners that secure the semi-circular retainers to the pinion flange. If the diameter of the propeller shaft is too large, there will either be insufficient access to the fasteners that retain the semi-circular retainers to the pinion flange or the weld yoke will need to be elongated and tapered to provide sufficient access to the fasteners that retain the semi-circular retainers to the pinion flange. Elongating and tapering the weld yoke, while being an adequate solution in most applications, leaves room for improvement. This is because the tapered shape of the weld yoke is less efficient at transmitting torque than is the tubular shape of the propeller shaft.

Accordingly, it is desirable to have an arrangement where the diameter of the propeller shaft is not limited by the need to preserve access to fasteners that secure the semi-circular retainer to the pinion flange. In addition, it is desirable to provide a more stable and robust engagement between the pinion flange and the second pair of bearing cups than is presently provided by the semi-circular receivers and the semi-circular retainers. Furthermore, other desirable features and characteristics will become apparent from the subsequent detailed description and the appended claims, taken in conjunction with the accompanying drawings and the foregoing technical field and background.

SUMMARY

A U-joint arrangement and a method of using the U-joint arrangement for attaching a propeller shaft to a pinion flange are disclosed herein. At least one of the propeller shaft and the pinion flange has a pair of full-round receivers.

In a first, non-limiting embodiment, the U-joint arrangement includes, but is not limited to, a U-joint that includes a cross member and a plurality of bearing cups rotatably mounted to the cross member. A pair of bearing cups of the plurality of bearing cups have an outer diameter that is substantially less than an inner diameter of the pair of full-round receivers. The U-joint arrangement further includes a pair of retaining members that engage the pair of bearing cups and that are configured to engage the pair of full-round receivers. The pair of retaining members are further configured to support the pair of bearing cups within the pair of full-round receivers when the pair of retaining members are engaged with the pair of full-round receivers.

In another non-limiting embodiment, a U-joint arrangement includes, but is not limited to, a propeller shaft having a weld yoke having a first pair of full-round receivers. The U-joint arrangement further includes a U-joint including a cross member, a first pair of bearing cups rotatably mounted to the cross member and disposed opposite one another, and a second pair of bearing cups rotatably mounted to the cross member and disposed opposite one another. The first pair of bearing cups are rotatably engaged with the first pair of full-round receivers. Each bearing cup of the first pair of bearing cups and of the second pair of bearing cups has a cylindrical configuration and a circular cross section. The U-joint arrangement further includes a pinion flange having a second pair of full-round receivers each having an inner diameter that is substantially larger than an outer diameter of the second pair of bearing cups. The pinion flange is arranged with respect to the U-joint such that the second pair of bearing cups are disposed within the second pair of full-round receivers. The U-joint arrangement further includes a pair of retaining members having a substantially cylindrical configuration and a substantially circular cross section. Each retaining member of the pair of retaining members has an outer diameter that is substantially equal to the inner diameter of the second pair of full-round receivers and an inner diameter that is substantially equal to the outer diameter of the second pair of bearing cups. The pair of retaining members engage the first pair of bearing cups and further engage the second pair of full-round receivers whereby the pair of retaining members support the second pair of bearing cups within the second pair of full-round receivers.

In another non-limiting embodiment, the method for attaching a propeller shaft to a pinion flange using a U-joint arrangement, at least one of the propeller shaft and the pinion flange having a pair of full-round receivers, includes, but is not limited to, providing a U-joint and a pair of retaining members. The U-joint includes a cross member and a plurality of bearing cups that are rotatably mounted to the cross member. A pair of bearing cups of the plurality of bearing cups have an outer diameter that is substantially less than an inner diameter of the pair of full-round receivers. The pair of retaining members are configured to engage the pair of bearing cups, to engage the pair of full-round receivers, and to support the pair of bearing cups within the pair of full-round receives. The method further includes the step of positioning the U-joint such that the pair of bearing cups are disposed within the pair of full-round receivers. The method still further includes engaging both the pair of bearing cups and the pair of full-round receivers with the pair of retaining members such that the pair of retaining members supports the pair of bearing cups within the pair of full-round receivers.

DESCRIPTION OF THE DRAWINGS

One or more embodiments will hereinafter be described in conjunction with the following drawing figures, wherein like numerals denote like elements.

DETAILED DESCRIPTION

Figure 1:
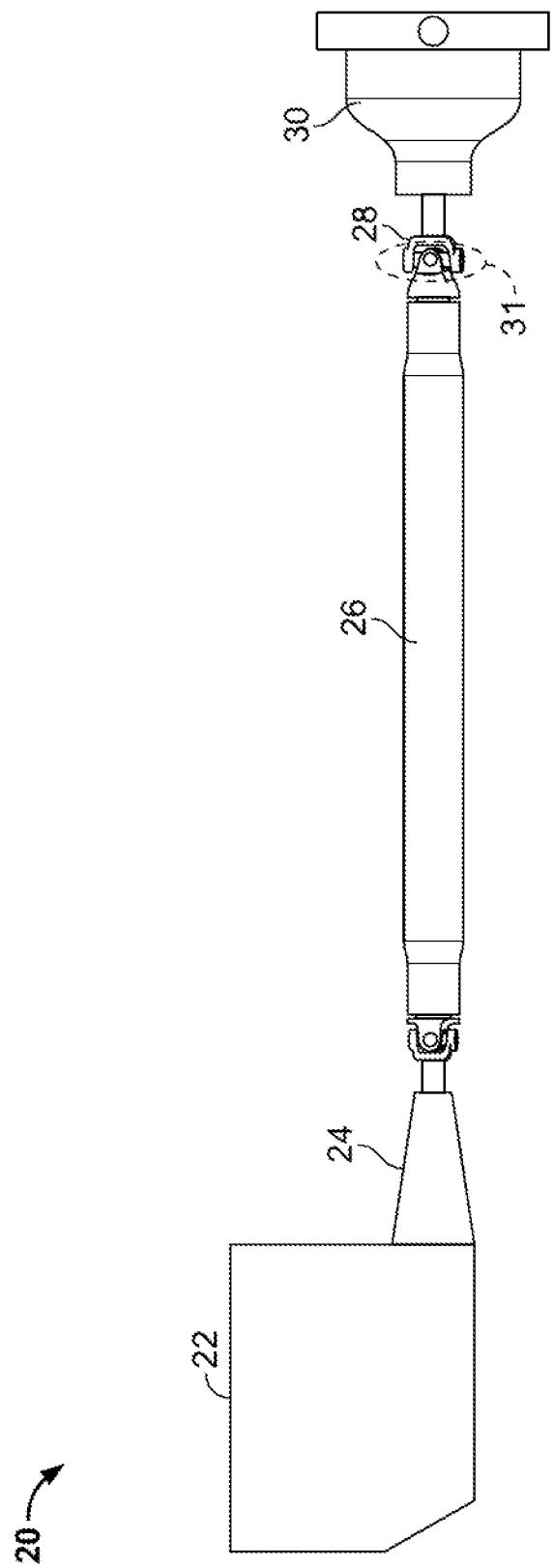
FIG. 1 is a schematic view illustrating a portion of a vehicle's powertrain.

The following detailed description is merely exemplary in nature and is not intended to limit application and uses. Furthermore, there is no intention to be bound by any expressed or implied theory presented in the preceding technical field, background, brief summary or the following detailed description.

An improved U-joint arrangement and method of connecting a propeller shaft to a pinion flange using the U-joint arrangement are disclosed herein. The improved U-joint arrangement utilizes full-round receivers on the pinion flange to engage the U-joint. To avoid the need to have specialized tools on hand to attach the U-joint to the full-round receivers on the pinion flange, the arrangement disclosed herein utilizes full-round receivers on the pinion flange having an inner diameter that is substantially larger than an outer diameter of the bearing cups of the U-joint. As used herein, the term "substantially larger" and/or "substantially smaller" when referencing the disparity in diameters between the inner diameter of the full-round receivers on the pinion flange and an outer diameter of bearing cups of the U-joint shall mean that the difference in diameters is large enough to permit the U-joint to be snaked or maneuvered into the openings of the full-round receivers by hand. Accordingly, this substantial difference in diameter allows the bearing cups of the U-joint to be easily and quickly positioned within the full-round openings of the pinion flange.

Once the U-joint has been positioned such that one pair of the bearing cups are positioned within the full-round receivers of the pinion flange, retaining members are attached to the pinion flange. The retaining members have a configuration that permits engagement with both the full-round receivers of the pinion flange and with the pair of bearing cups of the U-joint. For example, in one embodiment, the bearing cups are generally cylindrical and have a circular cross section. The retaining members are also generally cylindrical and have a circular cross section. Further, the full-round receivers have circular openings. In this embodiment, the outer diameter of each retaining member is substantially equal to the inner diameter of each full-round receiver and the inner diameter of each retaining member is substantially equal to the outer diameter of each bearing cup of the pair of bearing cups. Configured in this manner, the retaining members are enabled to engage both the full-round receivers and the bearing cups in order to support the bearing cups within the full-round receivers.

Additionally, the retaining members may be configured to be fastened to the full-round receivers using fasteners that may be inserted and/or tightened in a direction that is substantially transverse to a longitudinal axis of the propeller shaft. Such fasteners do not require access from an axial direction of the pinion flange as conventional semi-circular retainers do. Rather, fasteners that secure the retaining members to the full-round receivers may be inserted/tightened from a radial side of the full-round receivers. Accordingly, the propeller shaft will not obstruct access to the fasteners regardless of the propeller shaft's diameter.

A further understanding of the above described U-joint arrangement and an understanding of various methods that may be employed to attach a propeller shaft to a pinion flange using the U-joint arrangement may be obtained through a review of the illustrations accompanying this application together with a review of the detailed description that follows.

FIG. 1 is a schematic view illustrating a portion of a powertrain 20 of a conventional rear wheel drive vehicle. Powertrain 20 includes an internal combustion engine 22, and transmission 24, a propeller shaft 26, a pinion flange 28, and an axle 30. Propeller shaft 26 and pinion flange 28 are joined together via a U-joint arrangement 31 made in accordance with the teachings of the present disclosure, as described in detail below.

It should be understood that although powertrain 20 includes an internal combustion engine, other powertrains may utilize electric motors, hybrid electric motors, hydrogen fuel cells and/or other types of torque generating machines without departing from the teachings of the present disclosure. Additionally, while powertrain 20 depicts the powertrain of a conventional rear wheel driven vehicle, it should be understood that other types of drivetrain configurations may also be implemented including, but not limited to, all-wheel-drive vehicles and four-wheel-drive vehicles. Additionally, although the context of the discussion herein is with respect to automotive vehicles that utilize a propeller shaft, it should be understood that the teachings herein are compatible with other types of vehicles including, but not limited to, watercraft, aircraft, and spacecraft. Additionally, the teachings of the present disclosure are not limited to use with vehicles, but may also be utilized in any machine that utilizes a U-joint to join together rotating shafts of any sort.

Figure 2:
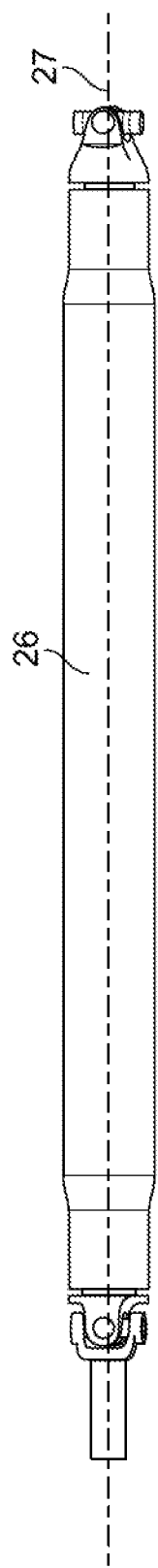
FIG. 2 is a perspective view of a propeller shaft for transmitting torque from a vehicle's engine to the vehicle's driven wheels.

FIG. 2 is a perspective view of propeller shaft 26 which transmits torque from the vehicle's internal combustion engine to the vehicle's driven wheels (not shown). Propeller shaft 26 may comprise any suitable conventional propeller shaft and need not be modified in order to be compatible with the U-joint arrangement of the present disclosure. As illustrated, propeller shaft 26 has a longitudinal axis 27. In conventional U-joint arrangements, the fasteners that secure the retainers to the pinion flange, discussed above, are secured in a direction that is substantially parallel to longitudinal axis 27. In the U-joint arrangement of the present disclosure, fasteners may be inserted in a direction that is substantially transverse to longitudinal axis 27 and thus will not be obstructed by propeller shaft 26 regardless of how large its diameter is.

Figure 3:
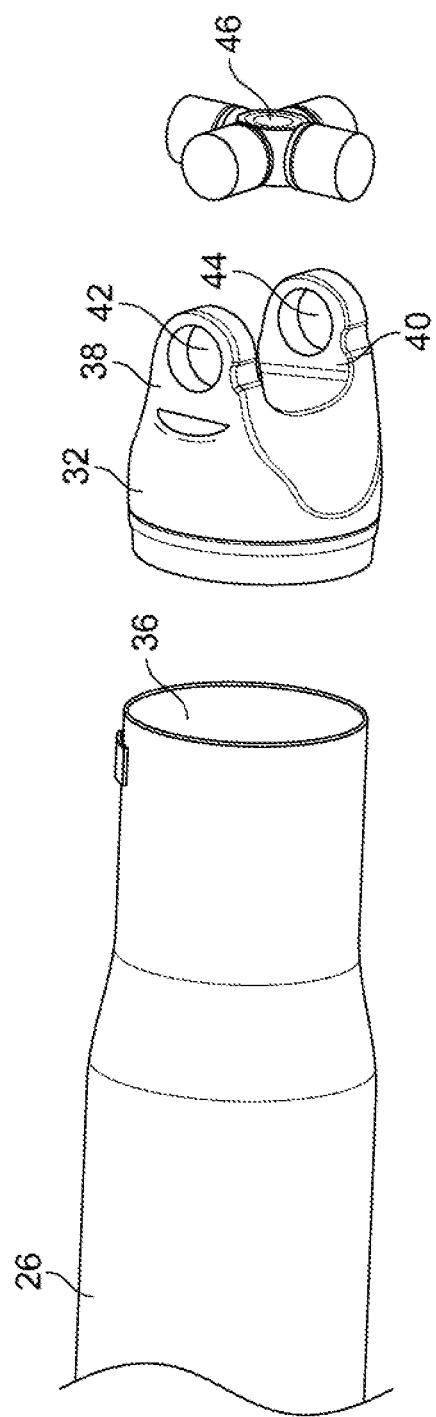
FIG. 3 is an exploded view of a portion of the propeller shaft of FIG. 2.

FIG. 3 is an exploded view of a portion of propeller shaft 26. With continuing reference to FIGS. 1-2, a weld yoke 32 is disposed proximate an axial end of propeller shaft 26 and is configured to be inserted within an axial opening 36 of propeller shaft 26. Once weld yoke 32 is positioned within axial opening 36, weld yoke 32 is welded or otherwise secured to propeller shaft 26.

Weld yoke 32 includes full-round receivers 38 and 40. Full-round receivers 38 and 40 extend in an axial direction from weld yoke 32 and include circular openings 42 and 44, respectively. Circular openings 42 and 44 are aligned in parallel with one another in a direction that is substantially transverse to longitudinal axis 27.

A U-joint 46, described in detail below, is configured to be received within circular openings 42 and 44 and thereby engage with full-round receivers 38 and 40. U-joint 46 forms a pivot axis about which propeller shaft 26 may pivot.

Figure 4:
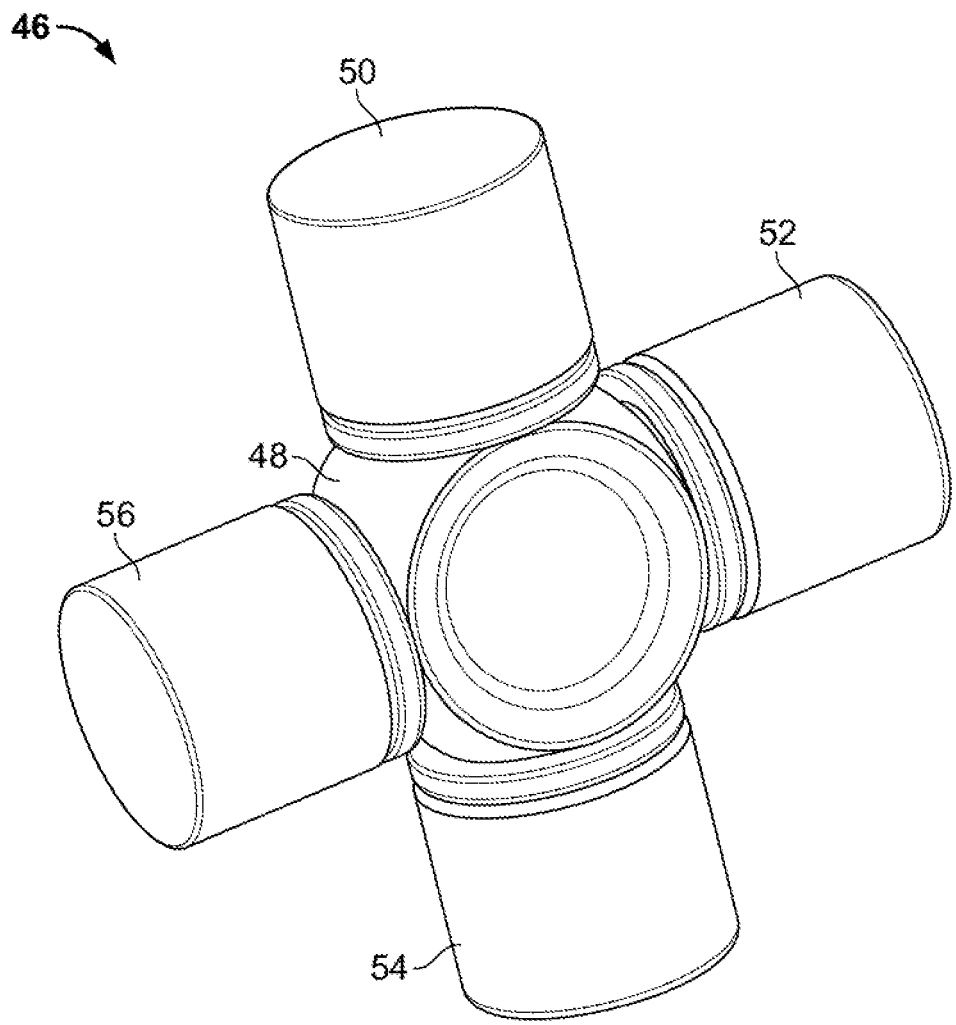
FIG. 4 is a perspective view of a U-joint for use with the U-joint arrangement of the present disclosure.

FIG. 4 is a perspective view of U-joint 46. U-joints are well known in the art. U-joint 46 includes a cross member 48 having four machined cylindrical protrusions arranged in a plus-sign configuration (not shown). U-joint 46 further includes four bearing cups 50, 52, 54, 56 that each have a generally cylindrical configuration. Bearing cups 50, 52, 54, and 56 each have cavities having a circular cross section and a circular opening at an axial end that are configured to receive the cylindrical protrusions of cross member 48. Configured in this manner, bearing cups 50, 52, 54, and 56 may engage the cylindrical protrusions of cross member 48 and when positioned on a respective protrusion, each bearing cup may rotate with respect to that protrusion. With continuing reference to FIGS. 1-3, when an opposite pair of bearing cups (e.g., bearing cups 50 and bearing cup 54) are engaged with full-round receivers 38 and 40, propeller shaft 26 is enabled to rotate together with that pair of bearing cups about their respective protrusions of cross member 48.

Figure 5:
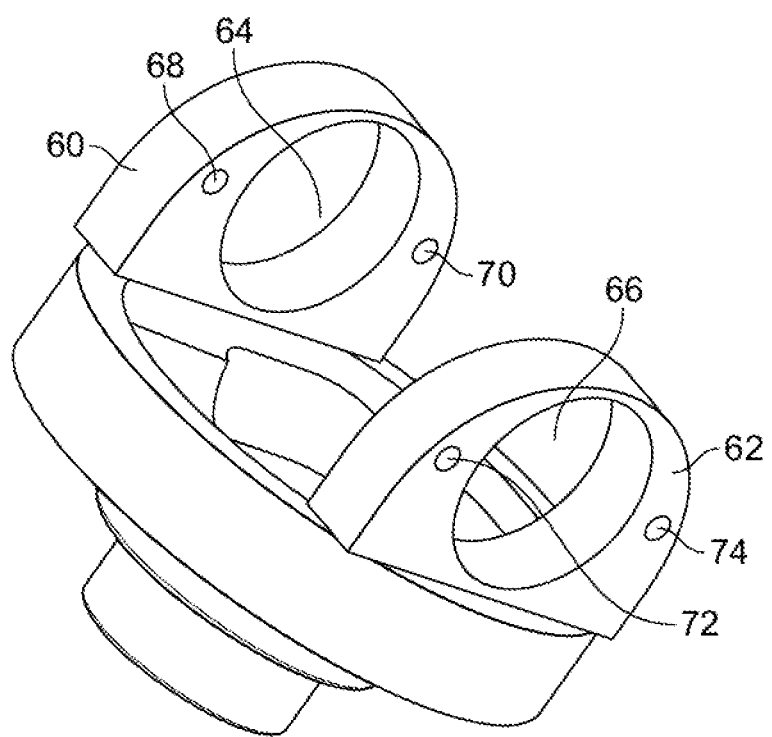
FIG. 5 is a perspective view of a pinion flange configured for use with the U-joint arrangement of the present disclosure.

FIG. 5 is a perspective view of a pinion flange 58 configured for use with the U-joint arrangement of the present disclosure. With continuing reference to FIGS. 1-4, pinion flange 58 includes a full-round receiver 60 and a full-round receiver 62. Full-round receiver 60 and full-round receiver 62 each define a circular opening 64 and a circular opening 66, respectively. Circular opening 64 and circular opening 66 are aligned in parallel with one another and each has an inner diameter that substantially exceeds the outer diameter of bearing cups 50, 52, 54, and 56. Accordingly, when U-joint 46 is positioned such that two of its oppositely disposed bearing cups (e.g., bearing cup 52 and bearing cup 56) are positioned within circular openings 64 and 66, the inner surfaces of circular opening 64 and 66 will not engage with the outer surfaces of the bearing cups.

Full-round receivers 60 and 62 each include a pair of fastener receivers. Full-round receiver 60 includes a fastener receiver 68 and a fastener receiver 70 and full-round receiver 62 includes a fastener receiver 72 and a fastener receiver 74. In other embodiments, each full-round receiver may include more than two fastener receivers while in still other embodiments, each full-round receiver may include only a single fastener receiver. Each fastener receiver is configured to receive a fastener (e.g., a threaded fastener) in such a way that the fastener may be inserted into the fastener receiver in a direction that is substantially transverse to longitudinal axis 27. This orientation allows for the insertion of fastener into each fastener receiver without obstruction by propeller shaft 26 or weld yoke 32.

The disparity between the inner diameter of each circular opening 64, 66 and the outer diameter of each bearing cup 50, 52, 54, and 56 makes it possible to insert a pair of oppositely disposed bearing cups (e.g. bearing cup 52 and bearing cup 56) of U-joint 46 into circular opening 64 and 66. This will be discussed below with reference to FIGS. 6-10.

Figure 6:
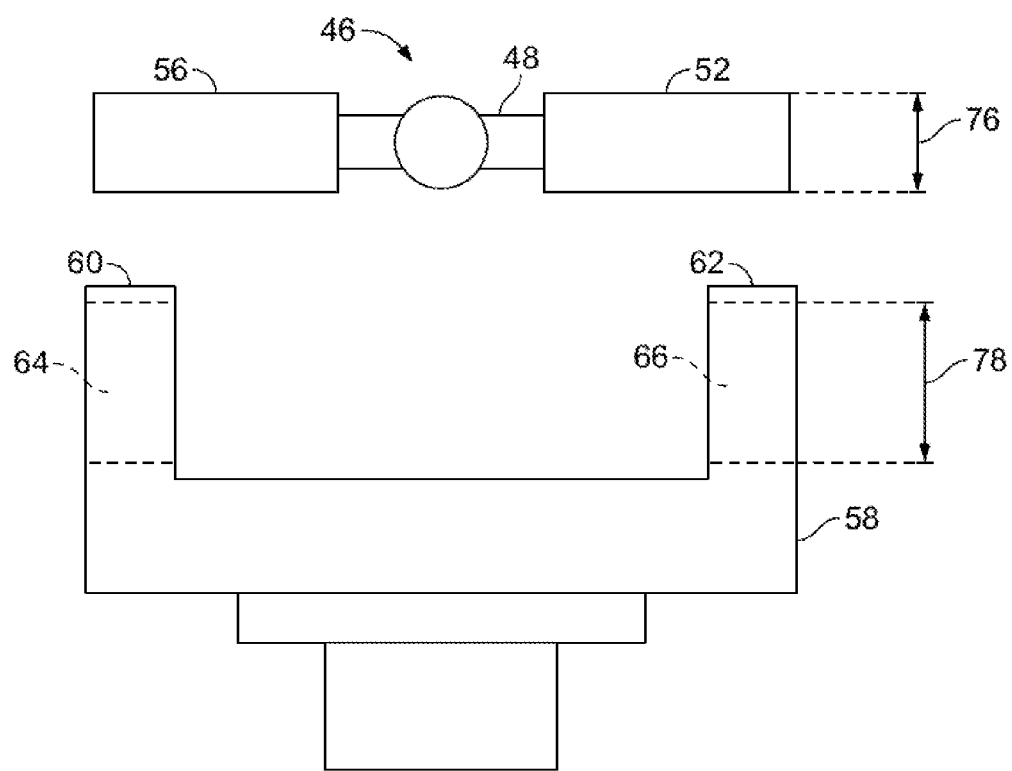
FIGS. 6-10 are simplified side views illustrating a procedure for positioning the U-joint of FIG. 4 with respect to the pinion flange of FIG. 4 when assembling the U-joint arrangement of the present disclosure.

FIG. 6 is a schematic view illustrating U-joint 46 positioned above pinion flange 58 prior to insertion. Circular openings 64 and 66 of full-round receivers 60 and 62, respectively, are illustrated with phantom lines. In the illustrated embodiment, bearing cups 50, 52, 54, and 56 each have substantially the same outer diameter. Additionally, circular openings 64 and 66 each have substantially the same inner diameter. In this view, the disparity between an outer diameter 76 of bearing cup 52 and an inner diameter 78 of circular opening 66 is plainly visible.

Figure 7:
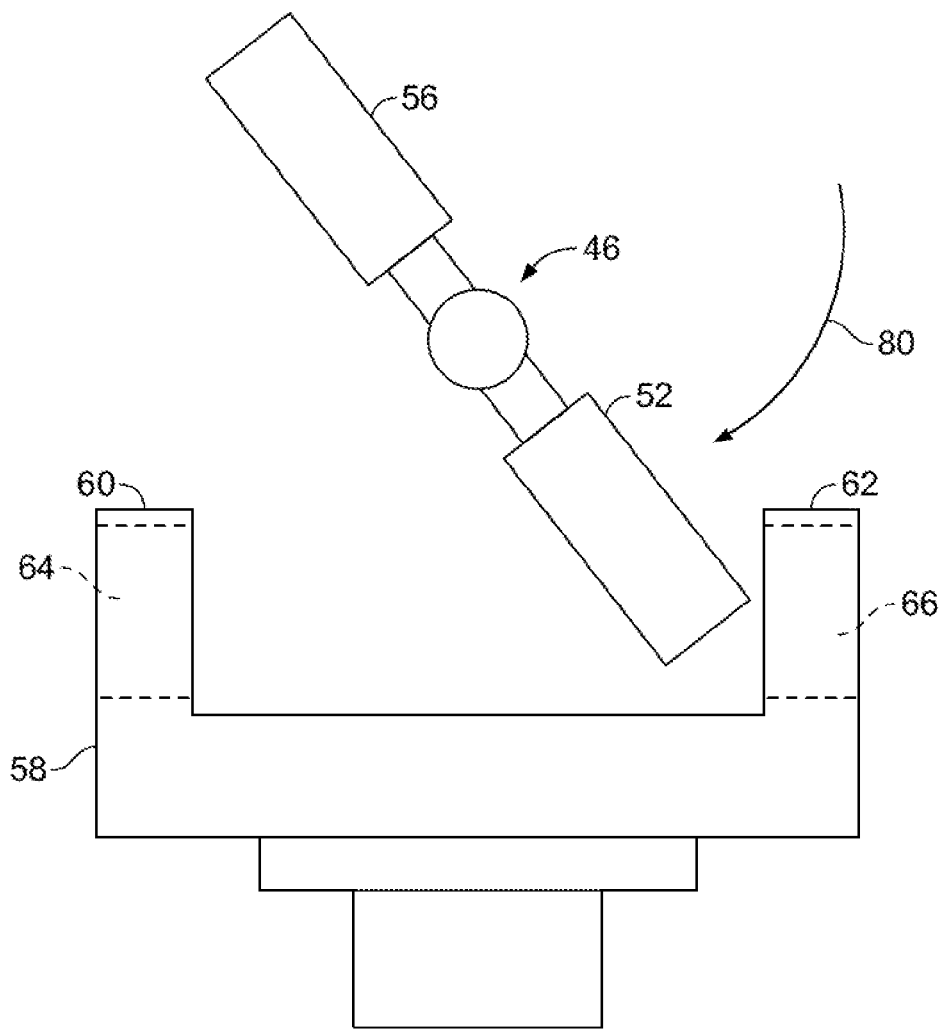

FIG. 7 depicts an initial stage of inserting bearing cups 52 and 56 of U-joint 46 into circular openings 66. U-joint 46 is tilted in the direction indicated by arrow 80 such that bearing cup 52 is angled downwardly towards circular opening 66. In this position, bearing cup 52 may be inserted into circular opening 66.

Figure 8:
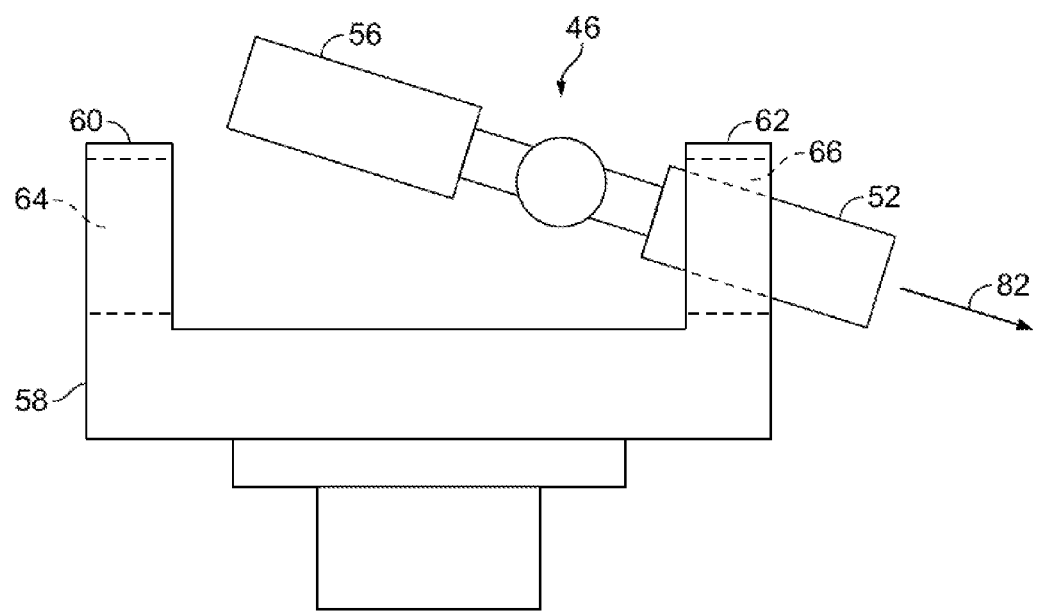

FIG. 8 depicts a subsequent stage of inserting bearing cups 52 and 56 of U-joint 46 into circular openings 66. U-joint 46 has been moved in the direction indicated by arrow 82 such that bearing cup 52 passes through circular opening 66 of full-round receiver 62. During this stage, U-joint 46 is moved far enough to the right (from the perspective of FIG. 8) to allow bearing cup 56 to clear full-round receiver 60 when bearing cup 56 is lowered towards pinion flange 58.

Figure 9:
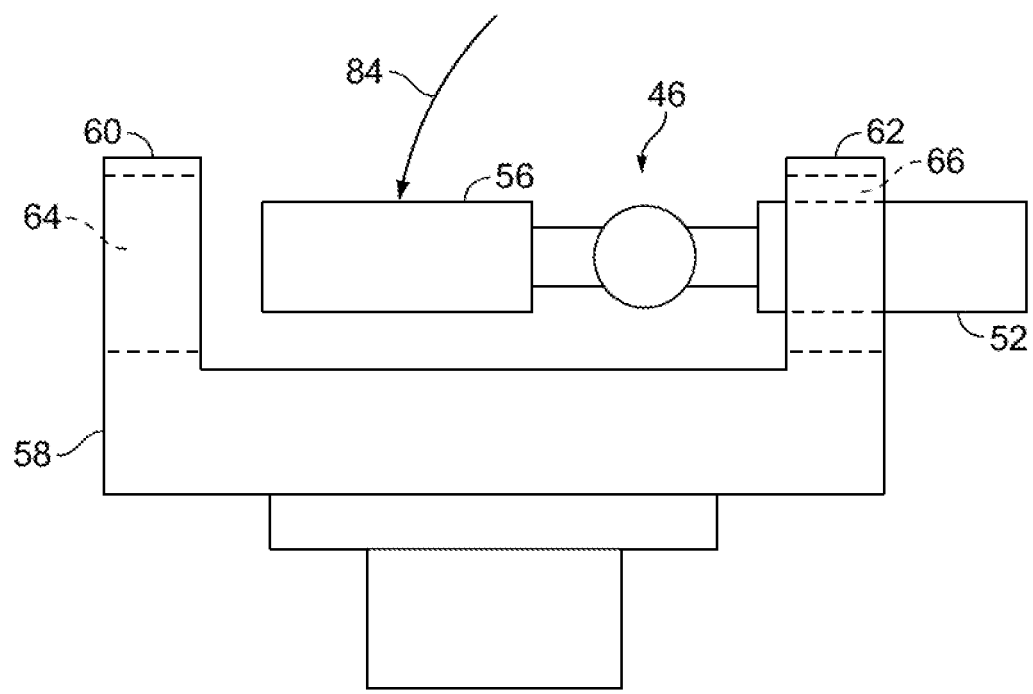

FIG. 9 depicts a subsequent stage of inserting bearing cups 52 and 56 of U-joint 46 into circular openings 66. U-joint 46 has been tilted in the direction indicated by arrow 84 such that retaining cup 56 has been moved to a position where it can now be inserted into circular opening 64.

Figure 10:
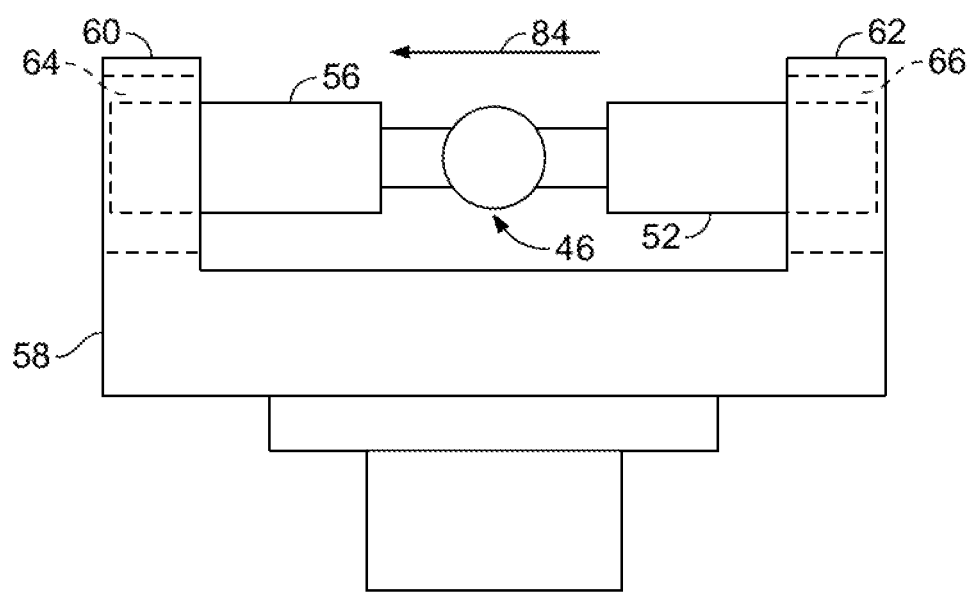

FIG. 10 depicts a final stage of inserting bearing cups 52 and 56 of U-joint 46 into circular openings 64 and 66. U-joint 46 is moved in the direction indicated by arrow 84 such that bearing cup 56 is disposed within circular opening 64.

Figure 11:
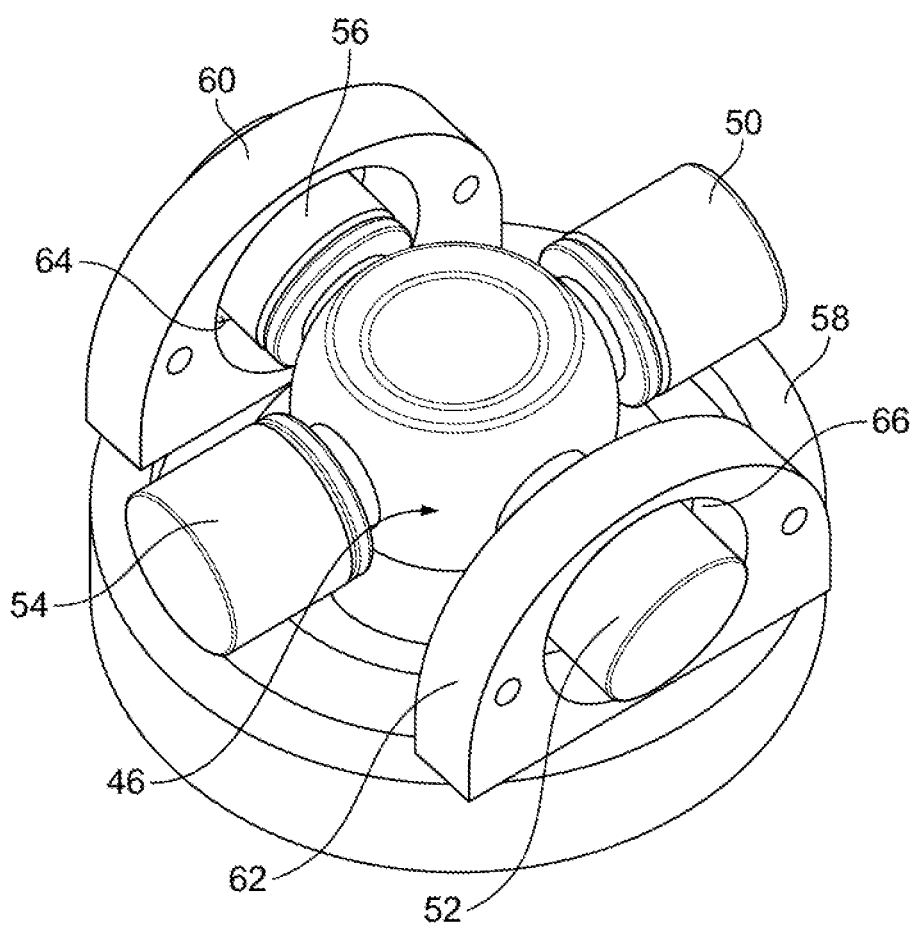
FIG. 11 is a perspective view illustrating the U-joint of FIG. 4 positioned within a pair of full-round receivers of the pinion flange of FIG. 5, prior to assembly of a pair of retaining members.

FIG. 11 is a perspective view illustrating U-joint 46 positioned within circular openings 64 and 66 of full-round receivers 60 and 62, respectively, of pinion flange 58. In this view, the disparity between the outer diameters of bearing cups 52 and 56, on the one hand, and the inner diameter's of circular openings 64 and 66, on the other hand, is plainly visible.

Figure 12:
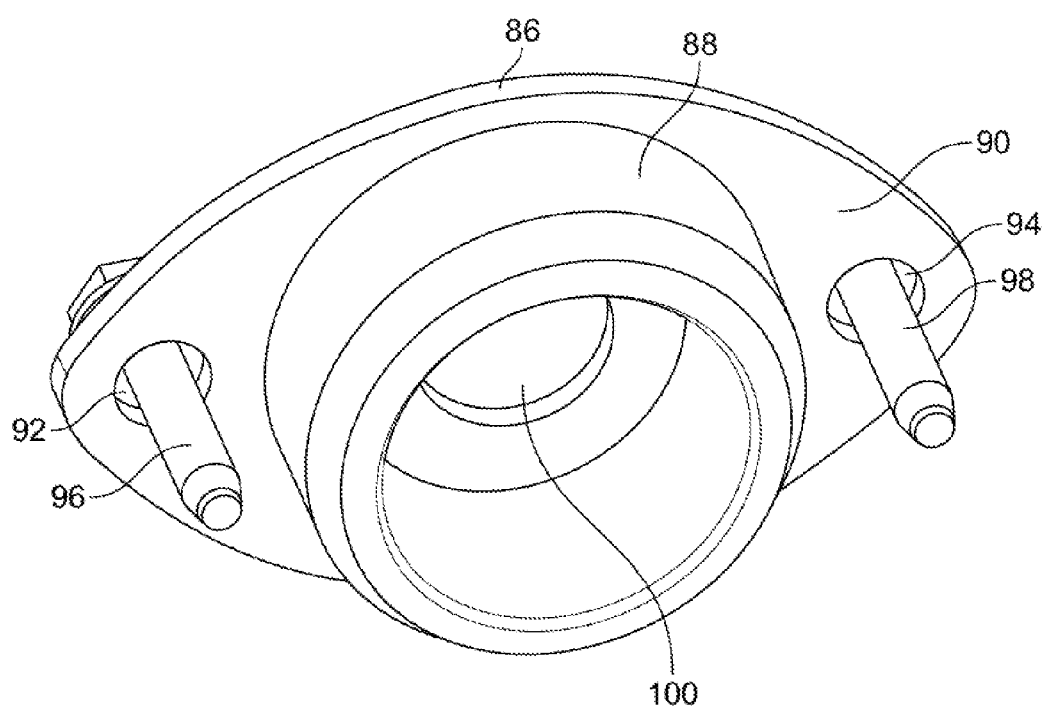
FIG. 12 is a perspective view illustrating a retaining member for use with the U-joint arrangement of the present disclosure.

FIG. 12 is a perspective view illustrating a retaining member 86. With continuing reference to FIGS. 1-11, retaining member 86 is configured to engage with both the full-round receivers of pinion flange 58 and the bearing cups of U-joint 46. Retaining member 86 includes a main portion 88 and a wing portion 90.

Wing portion 90 includes an attachment opening 92 and an attachment opening 94. Attachment openings 92 and 94 are configured to permit fasteners such as fastener 96 and fastener 98 to pass through attachment openings 92 and 94, respectively. Attachment openings 92 and 94 are further configured to axially align with the fastener receivers of full-round receivers 60 and 62 (e.g., fastener receiver 68 and fastener receiver 70). Configured in this manner, fasteners 96 and 98 may secure retaining member 86 to either full-round receiver 60 or to full round receiver 62. Additionally, the position and orientation of attachment openings 92 and 94 permit fasteners 96 and 98 to be inserted through attachment openings 92 and 94 in a direction that is substantially transverse to longitudinal axis 27 of propeller shaft 26.

Main portion 88 is a generally cylindrical structure having a circular cross section and extending transversely from wing portion 90. Main portion 88 has an outer diameter that is substantially equal to the inner diameter of circular openings 64 and 66 (e.g., inner diameter 78). Main portion 88 has an inner diameter that is substantially equal to the outer diameter of bearing cups 50, 52, 54, and 56 (outer diameter 76). Configured in this manner, retaining member 86 may engage the circular opening of one of the full-round receivers of pinion flange 58 and may also engage one of the bearing cups of U-joint 46. When U-joint 46 is positioned as illustrated in FIG. 11, retaining member 86 may be inserted into circular opening 66 and over bearing cup 52. A second retaining member may be inserted into circular opening 64 and fitted over bearing cup 56. When retaining member 86 is inserted and fitted in the manner just described, and when a second retaining member is inserted and fitted to engage the opposite full-round receiver and retaining cup, retaining member 86 and the second retaining cup cooperate to support U-joint 46 on pinion flange 58.

A removal opening 100 is located at a rear axial end of main portion 88. Removal opening 100 is configured to provide access to an axial end of the bearing cup that retaining member 86 is engaged with. With a portion of the axial end of the bearing exposed, a puller tool may be utilized to remove retaining member 86 from the bearing if maintenance/repair/replacement is ever required. Such a puller tool may be configured to engage a portion of retaining member 86 (e.g., wing portion 90) and is further configured to pass through removal opening 100 to engage the axial end of the bearing cup. Once engaged in this manner, the puller tool may be utilized to pry retaining member 86 apart from the bearing cup.

Figure 13:
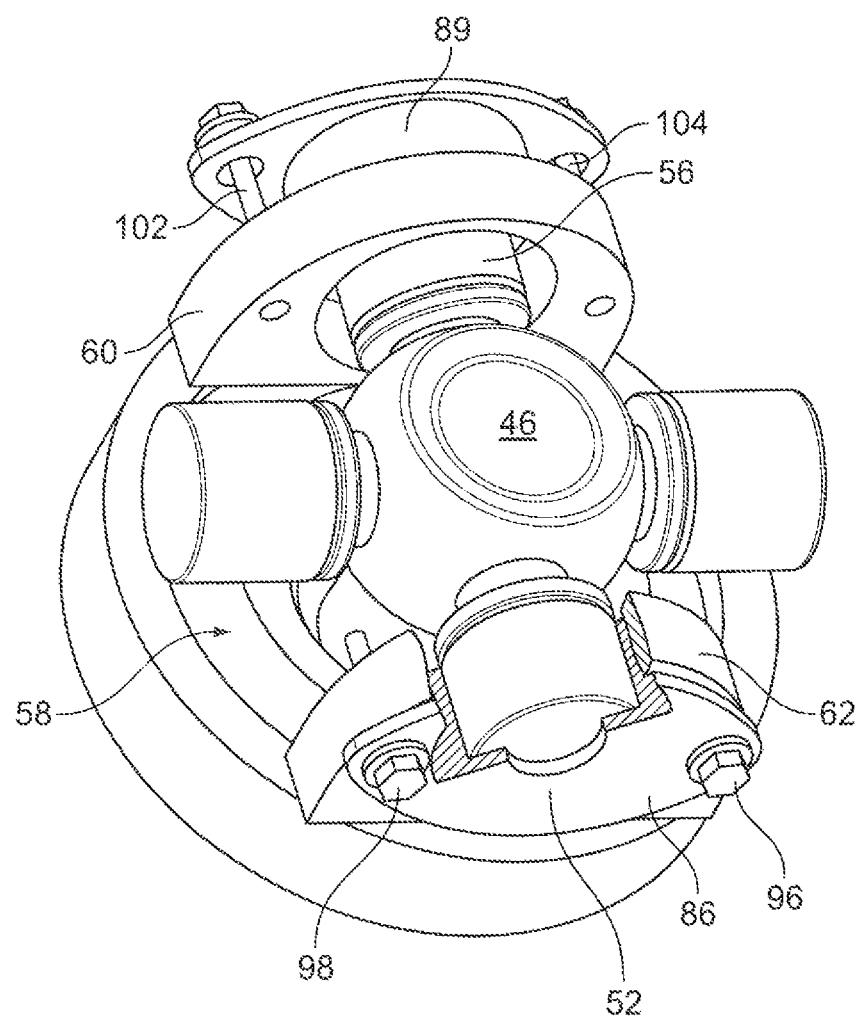
FIG. 13 is a perspective view illustrating the assembly of the retaining member of FIG. 12 to the assembly of the U-joint and pinion flange of FIG. 11.

FIG. 13 is a perspective view illustrating the engagement of retaining member 86 with both bearing cup 52 and full-round receiver 62. Retaining member 86 has been secured to full-round receiver 62 via fasteners 96 and 98. FIG. 13 also illustrates the engagement of a second retaining member, retaining member 89, with full-round receiver 60 and bearing cup 56. Once retaining member 89 is seated within full-round receiver 60 and seated over bearing cup 56, and once fasteners 102 and 104 are tightened to full-round receiver 60, U-joint 46 will be securely supported on pinion flange 58.

Figure 14:
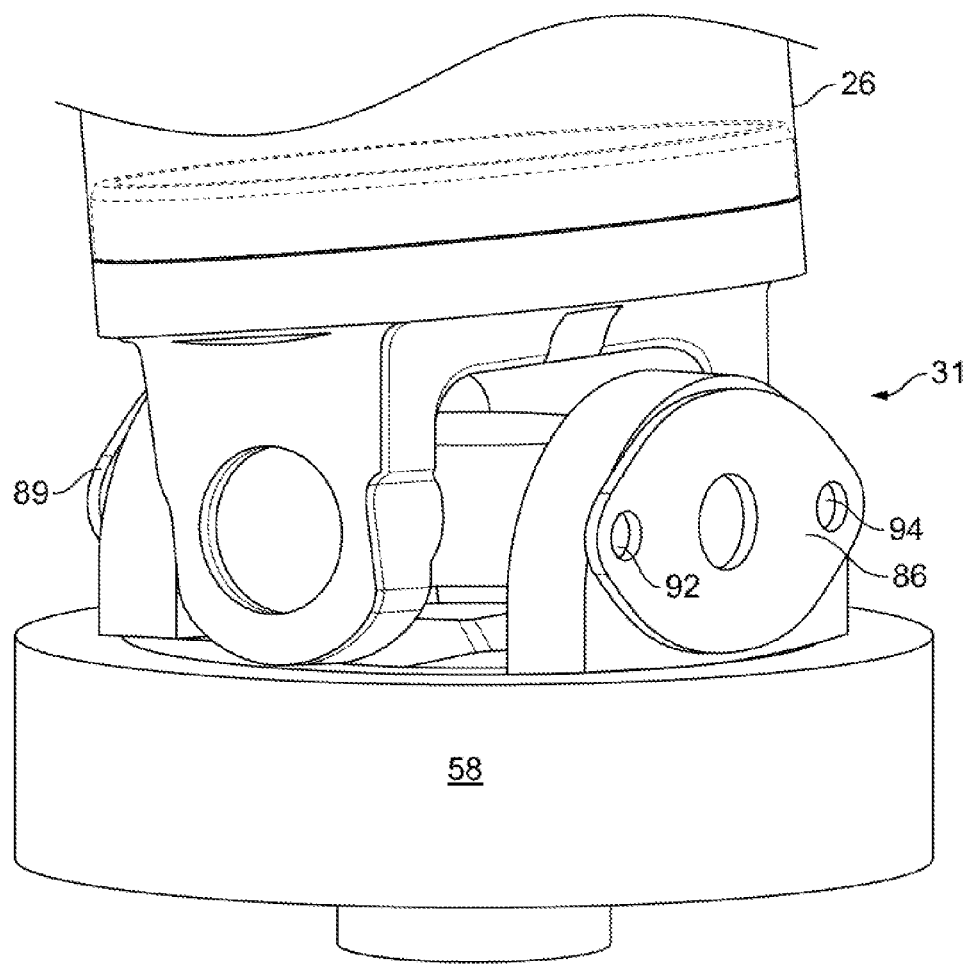
FIG. 14 is a perspective view illustrating the U-joint arrangement of the present disclosure.

FIG. 14 is a perspective view illustrating U-joint arrangement 31. In this view, propeller shaft 26 has been joined to pinion flange 58. With continuing reference to FIGS. 1-13, in FIG. 14, fasteners 96 and 98 have been omitted to illustrate that attachment opening 92 and attachment opening 94 are positioned and oriented to receive fasteners that may be inserted in a direction substantially transverse to longitudinal axis 27 of propeller shaft 26.

Figure 15:
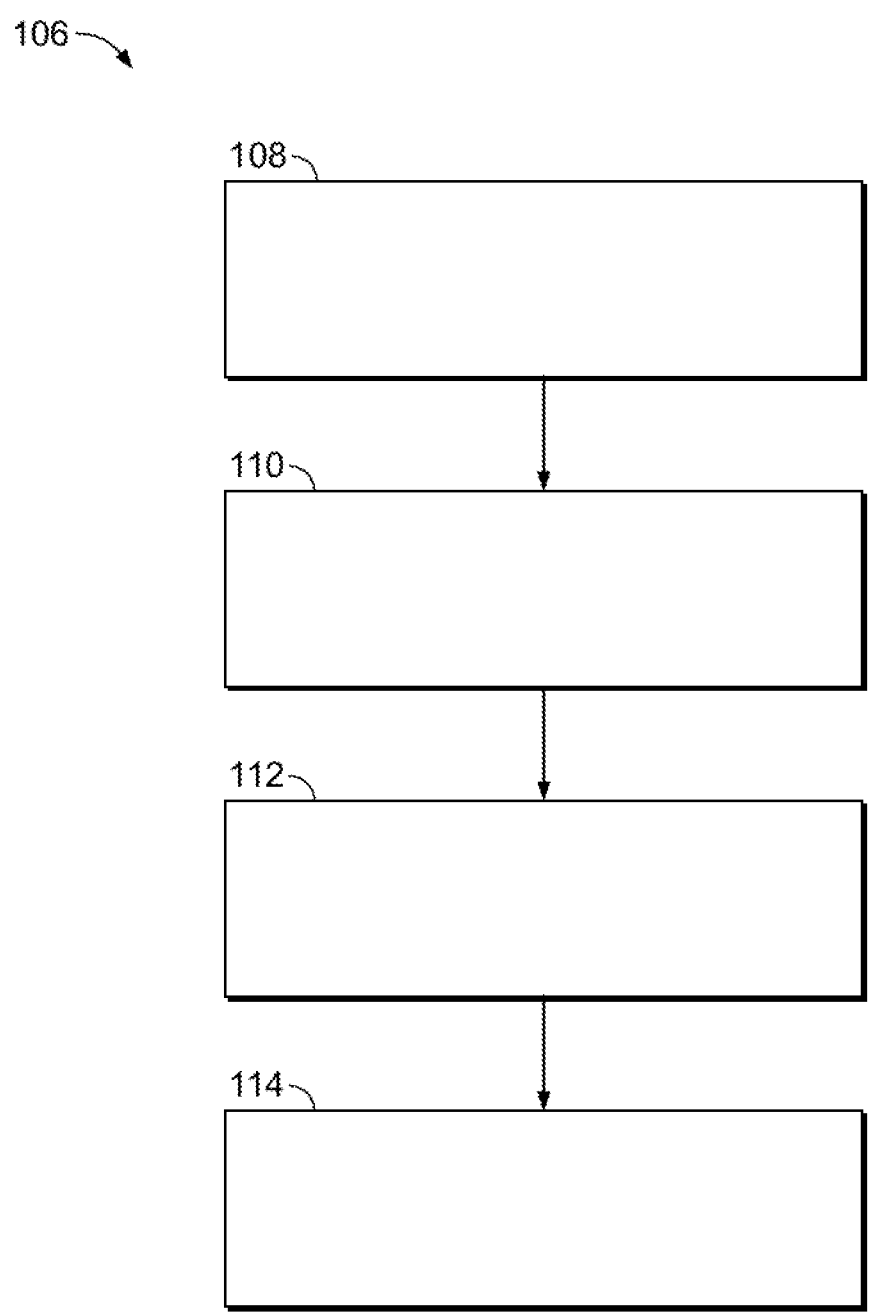
FIG. 15 is a block diagram illustrating a method of attaching a propeller shaft to a pinion flange.

FIG. 15 is a block diagram illustrating a method 106 of attaching a propeller shaft to a pinion flange. At least one of the propeller shaft and the pinion flange has a pair of full-round receivers. With continuing reference to FIGS. 1-14, at block 108, a U-joint (e.g., U-joint 46), a plurality of bearing cups (e.g., bearing cups 50, 52, 54, and 56) having an outer diameter substantially less than an inner diameter of the openings of the full-round receivers, and a pair of retaining members (e.g., retaining members 86 and 89) are provided.

At block 110, the U-joint is positioned such that a pair of oppositely disposed bearing cups are positioned within the openings of the full-round receivers.

At block 112, the pair of retaining members are engaged with both the full-round receivers and the pair of oppositely disposed bearing cups such that the pair of retaining members supports the pair of bearing cups within the full-round receivers.

At block 114, the retaining members are fastened to the full-round receivers. This may be accomplished through the use of threaded fasteners that engage threaded receivers of the full-round receivers. The threaded fasteners may be inserted in a direction that is substantially transverse to a longitudinal axis of the propeller shaft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A U-joint arrangement for attaching a propeller shaft to a pinion flange, at least one of the pinion flange and the propeller shaft having a pair of full-round receivers, the U-joint arrangement comprising:
   a U-joint including a cross member and a plurality of bearing cups rotatably mounted to the cross member, a pair of bearing cups of the plurality of bearing cups having an outer diameter that is substantially less than an inner diameter of the pair of full-round receivers; and
   a pair of retaining members engaging the pair of bearing cups, each retaining member of the pair of retaining members engaging both an axial end and a circular periphery of a corresponding bearing cup of the pair of bearing cups, the pair of retaining members configured to engage the pair of full-round receivers, the pair of retaining members further configured to support the pair of bearing cups within the pair of full-round receivers when the pair of retaining members are engaged with the pair of full-round receivers.

2. The U-joint arrangement of claim 1, wherein the pair of retaining members are configured to be removably attached to the pair of full-round receivers.

3. The U-joint arrangement of claim 2, wherein each retaining member of the pair of retaining members includes an attachment opening that is positioned to align with a fastener-receiving opening of each full-round receiver of the pair of full-round receivers when each retaining member is engaged with each full-round receiver.

4. The U-joint arrangement of claim 3, wherein the attachment opening is arranged to permit a fastener to be inserted through the attachment opening in a direction that is substantially transverse to a longitudinal axis of the propeller shaft.

5. The U-joint arrangement of claim 3, wherein each retaining member of the pair of retaining members includes a wing portion extending transversely outwardly from a main portion of each retaining member, and wherein the attachment opening is defined in the wing portion.

6. The U-joint arrangement of claim 3, wherein each retaining member of the pair of retaining members includes a pair of the attachment openings and wherein each pair of attachment openings is positioned to align with a respective pair of fastener-receiving openings defined in each full-round receiver of the pair of full-round receivers when each retaining member is engaged with each full-round receiver.

7. The U-joint arrangement of claim 6, wherein each retaining member of the pair of retaining members includes a pair of wing portions extending transversely outwardly from opposite sides of a main portion of each retaining member, and wherein each attachment opening of each pair of attachment openings is defined in a respective wing portion of each pair of retaining members.

8. The U-joint arrangement of claim 1, wherein each retaining member of the pair of retaining members has a configuration that substantially corresponds with a contour of a respective bearing cup of the pair of bearing cups.

9. The U-joint arrangement of claim 8, wherein each retaining member of the pair of retaining members has a main portion having a substantially cylindrical configuration that has a substantially circular cross section.

10. The U-joint arrangement of claim 9, wherein each retaining member of the pair of retaining members has an inner diameter that is substantially equal to an outer diameter of each bearing cup of the pair of bearing cups.

11. The U-joint arrangement of claim 1, wherein each retaining member of the pair of retaining members are configured to be removed from the pair of bearing cups.

12. The U-joint arrangement of claim 11, wherein each retaining member of the pair of retaining members is configured to engage a removal tool that is configured to separate each retaining member from a respective bearing cup.

13. The U-joint arrangement of claim 11, wherein each retaining member of the pair of retaining members includes a removal opening that is configured to provide access to the pair of bearing cups when the pair of retaining members are engaged with the pair of bearing cups.

14. The U-joint arrangement of claim 13, wherein the removal opening is disposed at an axial end of each retaining member of the pair of retaining members.

15. A U-joint arrangement comprising:
a propeller shaft having a weld yoke having a first pair of full-round receivers;
a U-joint including a cross member, a first pair of bearing cups rotatably mounted to the cross member and disposed opposite one another, and a second pair of bearing cups rotatably mounted to the cross member and disposed opposite one another, the first pair of bearing cups rotatably engaging the first pair of full-round receivers, each bearing cup of the first pair of bearing cups and of the second pair of bearing cups having a cylindrical configuration and a circular cross section,
a pinion flange having a second pair of full-round receivers each having an inner diameter that is substantially larger than an outer diameter of the second pair of bearing cups, the pinion flange being arranged with respect to the U-joint such that the second pair of bearing cups are disposed within the second pair of full-round receivers; and
a pair of retaining members having a substantially cylindrical configuration and a substantially circular cross section, each retaining member of the pair of retaining members having an outer diameter substantially equal to the inner diameter of the second pair of full-round receivers and an inner diameter substantially equal to the outer diameter of the second pair of bearing cups, the pair of retaining members engaging an axial end and a circular periphery of each bearing cup of the second pair of bearing cups and further engaging the second pair of full-round receivers whereby the pair of retaining members support the second pair of bearing cups within the second pair of full-round receivers.

16. The U-joint arrangement of claim 15, wherein the pair of retaining members are removably attached to the second pair of full-round receivers via threaded fasteners, the threaded fasteners being oriented substantially transversely to a longitudinal axis of the propeller shaft.

17. A method for attaching a propeller shaft to a pinion flange using a U-joint arrangement, at least one of the propeller shaft and the pinion flange having a pair of full-round receivers, the method comprising:
providing a U-joint and a pair of retaining members, the U-joint including a cross member and a plurality of bearing cups rotatably mounted to the cross member, a pair of bearing cups of the plurality of bearing cups having an outer diameter that is substantially less than an inner diameter of the pair of full-round receivers, each retaining member of the pair of retaining members configured to engage an axial end and a circular periphery of a corresponding bearing cup of the pair of bearing cups, the pair of retaining members further configured to engage the pair of full-round receivers, and to support the pair of bearing cups within the pair of full-round receives;
positioning the U-joint such that the pair of bearing cups are disposed within the pair of full-round receivers; and
engaging the axial end and the circular periphery of each bearing cup of the pair of bearing cups and the pair of full-round receivers with the pair of retaining members such that the pair of retaining members supports the pair of bearing cups within the pair of full-round receivers.

18. The method of claim 17, further comprising fastening the pair of retaining members to the pair of full-round receivers.

19. The method of claim 18, wherein fastening the pair of retaining members to the pair of full-round receivers comprises inserting a plurality of threaded fasteners through the pair of retaining members and engaging threaded openings disposed in the pair of full-round receivers.

20. The method of claim 19, wherein the plurality of threaded fasteners are inserted in a direction that is substantially transverse to the propeller shaft.

* * * * *